United States Patent [19]
Hofmann

[11] 4,213,568
[45] Jul. 22, 1980

[54] FUEL INJECTION NOZZLE

[75] Inventor: Karl Hofmann, Neckarrems, Fed. Rep. of Germany

[73] Assignee: Robert Bosch GmbH, Stuttgart, Fed. Rep. of Germany

[21] Appl. No.: 881,989

[22] Filed: Feb. 28, 1978

[30] Foreign Application Priority Data

Mar. 8, 1977 [DE] Fed. Rep. of Germany ....... 2709917

[51] Int. Cl.² ........................................... F02M 61/06
[52] U.S. Cl. ............................................... 239/533.4
[58] Field of Search ................................ 239/86–96, 239/453, 533.3–533.13

[56] References Cited
U.S. PATENT DOCUMENTS 3,035,780  5/1962  Peras ........................ 239/533.12 X

FOREIGN PATENT DOCUMENTS

| 347725 | 1/1922 | Fed. Rep. of Germany | 239/533.4 |
| 662061 | 7/1938 | Fed. Rep. of Germany | 239/533.12 |
| 894789 | 9/1953 | Fed. Rep. of Germany | 239/533.12 |
| 1026572 | 3/1958 | Fed. Rep. of Germany | 239/533.5 |
| 815409 | 6/1959 | United Kingdom | 239/533.6 |
| 906603 | 9/1962 | United Kingdom | 239/533.3 |

Primary Examiner—Andres Kashnikow
Attorney, Agent, or Firm—Edwin E. Greigg

[57] ABSTRACT

The invention relates to improvements in valve needles for fuel injection nozzles wherein the terminus of the needle that projects into the injection port of the valve body is tapered downwardly. As a consequence, a change in the flow cross section is attained even during idling or lower partial-load of the valve needle. This invention thus achieves an improvement in shifting smoothness, lower fuel consumption, the quality of the exhaust gas, as well as the entire efficiency of the internal combustion engine.

2 Claims, 4 Drawing Figures

FUEL INJECTION NOZZLE

BACKGROUND OF THE INVENTION

The invention relates to a fuel injection nozzle construction in which a nozzle body is bored to include a conical interior wall which merges at a ridged area into a cylindrical injection port and within the nozzle body is reciprocably disposed a valve needle comprising a throttle pin arranged downstream of a valve seat. As known, this type of valve needle opens in opposition to the direction of fuel flow and against a closing spring force. In conventional fuel injection nozzles of this kind the fuel is discharged between the throttle pin and the injection port during idling and low, partial-load operation as well as at the beginning of the feeding process. Upon the starting of an engine, a preliminary quantity of fuel is necessarily fed to the engine, however, in known nozzles the throttle pin emerges from the injection port and this causes preparation of the fuel, that is the atomization thereof, to be substantially impaired. This has a distinctly disadvantageous effect, particularly in Diesel engines which operate without a pre-combustion chamber. Moreover, this disadvantage becomes most notable because it results in relatively harsh shifting characteristic in the transitional speed range of the internal combustion engine as well as in a deterioration of the fuel consumption; of the exhaust gas and of the entire efficiency of the engine.

OBJECT AND SUMMARY OF THE INVENTION

The fuel injection nozzle according to the present invention has in contrast to the foregoing, the advantage that even in case of direct injection engines favorable engine parameters are obtained in the transitional range between idling and partial-load. Furthermore, according to the present invention, the annular cross section formed between the throttle pin and the injection port changes even in the intermediate range. Thus the throttle effect does not cease suddenly, but rather the throttle pin remains effective even into the full-load range of the engine. The annular cross section between the throttle pin and the injection port increases, depending on the quantity of fuel injected, so that the injection spray is further prepared substantially into the full-load range, while such preparation takes place in conventional throttle pin nozzles only in the idling and lower, partial-load ranges.

Another advantage derived from the teaching of this invention is the smooth, well defined flow of fuel as it is discharged into the combustion chamber of the internal combustion engine. This is achieved by the interior wall of the nozzle body being contoured to a configuration that is closely compatible to the throttle pin.

Still another advantage to be derived from the teaching of this invention is that the interior of the nozzle body is provided with merging conical portions that are complemental to the exterior shape of the throttle pin, thereby permitting the sealing cone of the valve needle to engage the complementally formed surface of the interior wall of the nozzle body while still at the same time allowing for a small degree of clearance between the downstream portion of the throttle pin and the complementally shaped wall of the nozzle body.

Yet another object of the invention is to shape the throttle pin adjacent to its terminal end portion in the form of a curve that extends longitudinally of the throttle pin.

These and other objects and advantages of the invention will be more readily apparent from a further consideration of the following detailed description of the drawings illustrating three preferred embodiments of the invention, in which:

DESCRIPTION OF THE PREFERRED EMBODIMENTS

Figure 1:
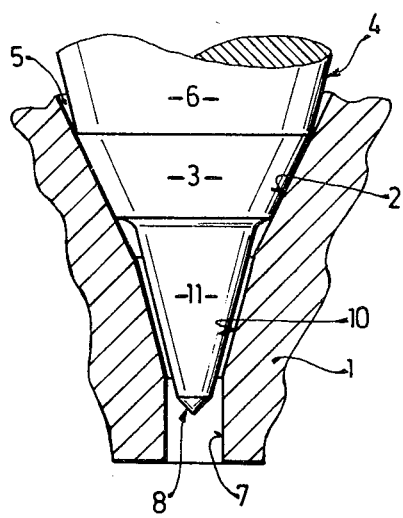
FIGS. 1, 2 and 3 show fragmentary portions of several embodiments of the invention showing the pin in elevation and the nozzle body and its fuel injection opening in cross section.
Figure 2:
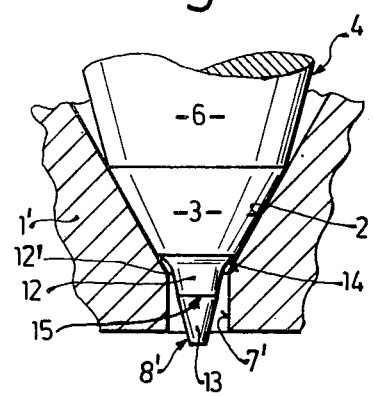
Figure 3:
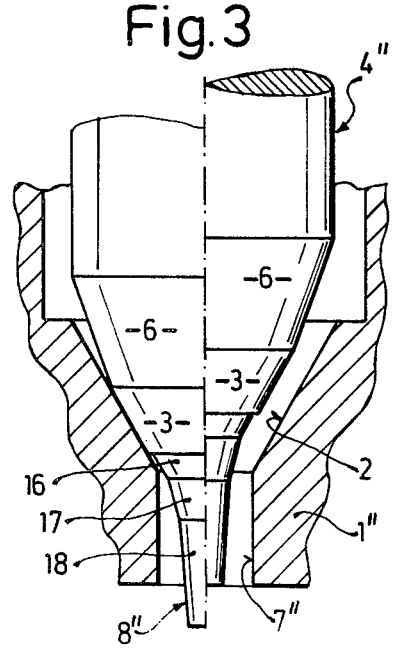

FIGS. 1 through 3 each show fragmentarily a longitudinal sectional view through that part of a fuel injection nozzle which contains the valve seat. In all embodiments, a valve seat 2 is arranged in a nozzle body 1, the complementally formed sealing cone 3 of a valve needle 4 being arranged to rest on this valve seat. From a fuel injection pump, not shown, the fuel passes under pressure into a pressure chamber 5 which is arranged between the nozzle body 1 and the valve needle 4, and at that point acts on pressure shoulders 6 provided above the conical area 3, all of which is only partially illustrated, and, which are effective in the opening direction and arranged at the valve needle 4. With an adequate pressure in the pressure chamber 5, the valve needle 4 is then displaced against a closing force, in most cases a known type of locking spring, so that the fuel can pass from the pressure chamber 5 past the conical valve seat 2 via an injection port 7 into a combustion chamber, not shown. To effect a preparation of the fuel, that is a satisfactory atomization, a throttle pin 8 extends into the injection port 7.

The throttle pin 8 is shaped to form a taper in the upward direction so that an opening stroke movement of the valve needle 4 results in an enlargement of the annular cross section formed between the tapered portion of the throttle pin 8 and the injection port 7. Accordingly, with an increasing quantity per unit time, that is of fuel discharged through the fuel injection nozzle, a correspondingly adjusted increasing cross section is provided so that the atomization effect remains preserved from idling up practically into the full-load range and in any event, as long as the throttle pin 8 exerts an influence on the fuel atomization.

In the embodiment of the invention shown in FIG. 1, the injection port 7 is shaped conically in the zone 10 and into this zone the tapered pin 11 projects when the fuel injection nozzle is closed. It will be understood that the conical zone 10 and that of the tapered pin 11 are of substantially the same configuration.

Figure 4:
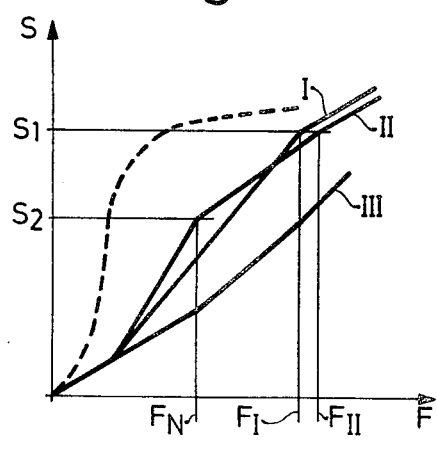
FIG. 4 shows diagramatically the stroke opening cross-sectional ratio for a known throttle pin nozzle when compared with this invention.

FIG. 4 shows diagramatically the function of the three embodiments of this invention. The stroke of the valve needle S is plotted over the ordinate, and the flow cross section F of the injection nozzle is plotted over the abscissa. The dashed curve line of FIG. 4 corresponds to a conventional nozzle with a throttle pin. In such a known nozzle, the flow cross section F changes hardly at all after the first injection step until the stroke $S_1$ has been accomplished. Thereafter, that is at the instant when the throttle pin 8 emerges from the injection port 7, the cross section F is then very greatly enlarged. The cross-sectional ratio of the stroke is then determined by the cross section present at the valve seat 2 rather than by the throttle pin 8.

In contrast thereto, curve I corresponds to the embodiment of the invention depicted by FIG. 1. Assuming that, at the stroke $S_1$, the conical pin 11 emerges completely from the injection port 7, this emerging condition corresponds to a flow cross section $F_I$. As can be seen from the diagram, this cross section $F_I$ is almost twice as large as the cross section $F_N$ obtained with a normal throttle nozzle when the pin emerges. This straight course of the curve I provides the aforementioned advantages.

In the embodiment of the invention illustrated in FIG. 2, the cylindrical injection port 7' merges at ridge 12' directly into the conical seat 2. In addition, the throttle pin 8' which extends into the cylindrical injection port 7', consists of two truncated cones of differing inclinations which merge into each other without transition. On the one hand in the event of minus strokes of the valve needle 4', the truncated cone 12 provided adjacent to the sealing cone 3 determines the flow cross section, whereas on the other hand on larger opening strokes the truncated cone 13 that is provided at the terminus of the valve needle 4' determines the flow cross section. Accordingly, the flow cross section is determined by the narrowest passage point. This narrowest passage point is formed between an annular undercut edge 14 and the truncated cones 12 and 13 into which the undercut area merges. The annular undercut edge 14 is produced adjacent to the ridge 12' at the point of intersection between the conical valve seat 2 and the cylindrical injection port 7'. The embodiment of the invention shown in FIG. 2 corresponds to curve II in FIG. 4 and it will be observed that the curve II has an additional break approximately at the stroke $S_2$. This is achieved by the edge 15 provided between the two truncated cones 12 and 13. When the stroke S is increased, the annular cross section through which the fuel is discharged increases to a greater extent than that below the stroke $S_2$. Once the truncated cone 13 emerges from the cylindrical injection port 7', cross section $F_{II}$ is attained.

In the third embodiment of the invention depicted in FIG. 3, a particularly smooth transition is desired between idling and full-load. While the left-hand half of the valve needle 4" is shown in a closed condition, the right-hand half is illustrated in an opened condition. The throttle pin 8" in this embodiment of the invention consists of three truncated cones 16, 17 and 18, the angle of inclination of each of which increases in a downward direction, as contrasted to the construction shown in FIG. 2. In this manner, the structure of the nozzle shown in FIG. 3 results in the curve III depicted in FIG. 4. It will be noted that the angle of inclination of the truncated cone 16 corresponds approximately to the angle of inclination of the conical valve seat 2. In this embodiment of the invention the transition between these angles is shaped to be extremely smooth which is of decisive advantage for certain types of internal combustion engines.

In place of individual truncated cones, the throttle pin 8 can also be shaped in the form of a curve in its longitudinal direction to thereby obtain a smooth transition which is of maximum advantage from the standpoint of flow dynamics.

The closing force, not shown, effective on the valve needle, especially one or more springs, can increase progressively with an increasing opening stroke. In this manner, the opening cross section of the nozzle is adapted more advantageously to the amount of fuel to be injected as well as more favorable atomization.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection nozzle for internal combustion engines comprising a bored nozzle body having plural merging interior walls of varying inclination including a valve seat and a central injection port, a reciprocable valve needle arranged to be received within said bored nozzle body, said valve needle arranged to open in opposition to fuel flow and against a closing force, said valve seat having a conical shape and adapted to merge into said injection port, said valve needle including a sealing cone adapted to rest on said valve seat in sealing engagement therewith when said nozzle is closed and further including a throttle pin arranged below of said sealing cone for accommodation within said injection port and wherein said throttle pin comprises a plurality of integrated truncated cones tapering inwardly downward with differing tapers from said sealing cone and merging into one another without transition for projection into said injection port when the fuel injection nozzle is closed, the uppermost of said truncated cones extending directly from said sealing cone.

2. A fuel injection nozzle as claimed in claim 1, wherein said closing force exerted on the valve needle increases progressively with an increasing stroke of said valve needle.

* * * * *